US006262548B1

(12) United States Patent
Scholten et al.

(10) Patent No.: US 6,262,548 B1

(45) Date of Patent: Jul. 17, 2001

(54) DOOR DRIVE FOR A PIVOT-HUNG DOOR

(75) Inventors: Jan Scholten, Essen; Peter Kisters, Goch; Guido Schneider, Herdecke, all of (DE)

(73) Assignee: Dorma GmbH + Co. KG, Ennepetal (DE)

(*) Notice: Subject to any disclaimer, the term of this patent is extended or adjusted under 35 U.S.C. 154(b) by 0 days.

(21) Appl. No.: 09/482,365

(22) Filed: Jan. 13, 2000

(30) Foreign Application Priority Data

Jan. 14, 1999 (DE) ........................................ 199 01 033

(51) Int. Cl.[7] ........................................ G05B 5/00

(52) U.S. Cl. ........................ 318/445; 318/3; 318/9; 16/62

(58) Field of Search ........................ 318/9, 3, 445; 16/62, 49

(56) References Cited

U.S. PATENT DOCUMENTS

| | | | | |
|---|---|---|---|---|
| 1,684,704 | | 9/1928 | Hubbell . | |
| 2,256,613 | | 9/1941 | Forman et al. . | |
| 4,333,270 | | 6/1982 | Catlett . | |
| 4,339,843 | * | 7/1982 | Burnett, Jr. | 16/62 |
| 5,386,885 | * | 2/1995 | Bunzl et al. | 16/49 |

FOREIGN PATENT DOCUMENTS

| | | |
|---|---|---|
| 3202930 | 8/1983 | (DE) . |
| 3645313 | 10/1987 | (DE) . |
| 3730114 | 5/1988 | (DE) . |
| 4124282 | 1/1993 | (DE) . |
| 8900262 | 11/1989 | (WO) . |

OTHER PUBLICATIONS

Dorma Catalog.

* cited by examiner

*Primary Examiner*—Karen Masih

(74) *Attorney, Agent, or Firm*—Nils H. Ljungman & Associates

(57) ABSTRACT

This invention relates to a pivot-hung door drive system with an electro-mechanical device that supplies the closing moment required for the opening and closing of the door, comprising a transmission which varies its translation ratio over the angle of rotation of the door, a guide that is connected with an output shaft and a driver roller that can execute a translation movement relative to the guide and in the guide, which driver roller is connected with a pinion that is engaged with a toothed rack that is connected with the spring system, whereby the axis of rotation of the output shaft is at a defined distance from the axis of rotation of the pinion, and the axis of rotation of the driver roller is at a defined distance from the axis of rotation of the pinion, such that when the output shaft and pinion are rotated, the translation ratio changes as a result of the changing axial distance between the output shaft and the driver roller.

20 Claims, 7 Drawing Sheets

DOOR DRIVE FOR A PIVOT-HUNG DOOR

BACKGROUND OF THE INVENTION

1. Field of the Invention

The present invention relates to a pivot-hung door drive system with an electro-mechanical or electro-hydraulic device that supplies the opening and closing moment required to open and close a connected pivot-hung door panel.

2. Background Information

German Patent No. 41 24 282 C2 describes a pivot-hung or swinging or swiveling door drive system in which the connected door is automatically opened electro-mechanically by the pivot-hung door drive system. The closing process is carried out with the assistance of the motor drive by an integrated closing spring which can be located in a commercially available door closer, for example. In that case, a reduced drive moment is applied to the motor drive, whereby the motor only makes up the losses in the gear train. This type of control eliminates the need for a continuous engagement of the coupling, and simultaneously results in reduced wear, because the coupling does not need to be re-engaged for the reversing process of the pivot-hung door. This pivot-hung door drive system is equipped with a scissors-type linkage.

Such a drive system can be installed on the door frame or on the door. In addition to the scissors-type or pantograph linkage described above, a parallel linkage and a slide rail in connection with a straight actuator arm can also be used. While the closing moments for scissors-type or pantograph linkage sufficient for standard tasks, the closing moments or movements for the closing process are generally very low when a slide rail is used.

German Patent No. 37 30 114 A1 describes a device for opening and closing doors that consists of two mounting parts. The one part is fastened to the door leaf and the other part of the device is fastened on the frame side, whereby the two mounting parts are connected to each other by a force transmission mechanism. At the same time, there is a reversing mechanism with a locking coupling, which simultaneously limits the forces to be transmitted. For this purpose, conventional, commercially available door closers can be used, although they must have a closing spring. The drive wheel of the device, which is connected on one end with the force transmission mechanism, has a pinion which is effectively connected with a rack.

WO 89/11578 describes a drive system for a pivot-hung door that operates in a similar fashion. In this case, there is a device for the opening process, and the closing process is accomplished, as in DE 41 24 282 C2, by the force of a door closer.

Similar drive systems for pivot-hung doors are described in U.S. Pat. No. 1,684,704 and U.S. Pat. No. 2,256,613. There again, drive systems are described in connection with door closers, although the door closer is installed as a separate component on the door panel, and the drive system for the pivot-hung door is located above the door panel. The connection between the drive system for the pivot-hung door and the door closer is in the form of a scissors-type linkage. U.S. Pat. No. 4,333,270 discloses a drive system for a pivot-hung door that works electro-magnetically. In this case, a drive wheel interacts with a rack, so that a spring for the closing of the door is stretched during the opening process.

German Patent No. 32 02 930 A1 discloses an electro-mechanical pivot-hung door drive system that uses a directcurrent motor in connection with a planetary gear train for the drive system. There is a toggle lever linkage between the output shaft and the connected door. This drive system for a pivot-hung door is used for both the opening process and the closing process of the door to which it is connected.

An advertising brochure published by DORMA GmbH + Co. KG describes an electro-hydraulic drive system designated Model ED 200 designed for use with a pivot-hung door. The drive system in question is a compact drive unit that opens the door against the force of a spring and mechanically returns the door to the closed position using the restoring forces of the spring. This drive system can thereby be installed on the door frame or on the door. In this system, an electric motor drives a pump which pumps a corresponding volume of oil into a hydraulic cylinder, which in turn expands against the force of a spring. The piston of the hydraulic cylinder is thereby provided with gear teeth that drive a pinion, to which the lever mechanism that actuates the door is attached. To return the door to the closed position, appropriate valves are opened and the volume of oil can flow back into the reservoir of the drive unit. The spring thereby pushes the piston back and closes the door by its movement, which is transmitted to the pinion.

OBJECT OF THE INVENTION

One object of the present invention is therefore to improve a pivot-hung door drive system described in some publications so that, to avoid the above-mentioned disadvantages, an essentially simple construction and an essentially easy adaptation to the desired torque curves over the opening angle become possible.

SUMMARY OF THE INVENTION

This object of the present invention may be accomplished by the fact that between the output shaft of the pivot-hung door system and the linkage or the actuator arm, there may be a device that effects a change in the opening and closing moment over the angle of rotation of the pivot-hung door panel.

It is desirable to increase the moments for the closing range in the range of essentially small door opening angles, for example.

In one possible embodiment of the present invention, the present invention may include a door piston that is guided in a housing, whereby the drive shaft or output shaft of the door piston may be connected to a door by means of an actuator arm or a linkage. There may also be an energy storage mechanism in the form of a spring, which spring can store energy during the opening of the door and can release it again for a subsequent automatic closing process.

In another possible embodiment of the present invention, the present invention may include a door closer, which door closer may have at least two different translation ratios, as a function of direction and of the distance traveled by the door, whereby a fixed or solid coupling between the opening force and the closing force applied to the door may be neutralized by the fact that, between the spring and the door piston, there may be at least one hydraulic transmission, which hydraulic transmission may include at least one spring piston, the door piston, and an inner piston inside the door piston, as well as a chamber that is defined by the inner piston and a housing surrounding the inner piston.

In other words, in another possible embodiment of the present invention, the present invention may include a door closer such that with a usually high closing moment, only a usually small opening moment is required to open the door. The small opening moment and high closing moment may be accomplished in that a fixed coupling or translation ratio between the pinion and the output shaft, and thus between the opening and closing force, is not maintained during the opening and closing processes of the invention, which means that the translation ratio between the pinion and the output shaft changes as the door is opened and closed. A hydraulic transmission between the rack and pinion and the actuator arm, which actuator arm actuates the door, may permit a door closer to be configured such that it may generate a high closing moment or force for closing the door but only a small opening moment or force for opening the door. Under certain very special circumstances, the opposite effect may be desirable.

As a result of the translation or conversion of the translation movement of the piston into a rotational movement of the pinion, there is a variation of the reference diameter. The pinion moments can be adjusted by means of the variable lever arm, while the piston or peripheral force on the output pinion remains constant. At the same time, on account of the greater spring force, this or the piston or the peripheral force on the output pinion can be reduced by the interposition of a transmission between the output shaft and linkage. The invention also teaches that it is possible to reduce the spring travel by means of a further variation of the reference diameter. The curve of the closing moment is a superimposition of the influences of the translation or transmission function, or the reference diameter and of the spring force curve.

The pinions used in some publications, in contrast to the pinions in the present invention, have a pitch or rolling curve profile that is composed of segmentally constant radii. An example of the solution used for the constructive integration of the variable reference or pitch circle diameter is the principle described in German Patent No. 36 45 313 C2. The result, for the matching gearing associated with the toothed pinion, for example, is a stretched-out S-shaped pitch curve. By an appropriate selection of the profile of the pitch curve and of the flank angle, the objective is thereby to minimize the friction resulting from the guide wall of the toothed rack. The pinion-side gearing has varied profile displacements over its pitch curve. In the range of large door opening angles, i.e. of small pitch circle diameters, the gearing is displaced radially outward by positive profile displacement. Accordingly, a profile displacement in the opposite direction is made on the toothed rack. The gearing also has a modulus which varies over the pitch curve. The modulus is thereby only great enough so that the strength of the gearing is sufficient. The results described here were obtained empirically.

In one possible embodiment of the present invention, the present invention teaches that the desired variable translation ratio may be achieved most efficiently by a separation or decoupling of the necessary lever length changes of the transmission from the function of the conversion of the rotational motion. The result is not only a wide variety of potential adaptations to desired torque curves, but also a greatly economical construction.

In other words, in one possible embodiment of the present invention, there may not be a fixed coupling or translation ration between the pinion and the output shaft, and thus between the opening and closing force, during the opening and closing processes of the present invention. For example, there may be a hydraulic transmission between the rack and pinion and the actuator arm, which actuator arm actuates the door. Such a transmission may permit a door closer to be configured such that it may generate a high closing moment or force for closing the door but only a small opening moment or force for opening the door. Under certain very special circumstances, the opposite effect may be desirable.

In other words, the present invention may permit a door to be opened gradually, closed gradually, or opened and closed gradually, without slamming, yanking, or pulling, and without sudden lurches, jerks, swings, or stops. The present invention may also permit a door to be opened suddenly or with an essentially large amount of force, closed suddenly or with an essentially large amount of force, or opened and closed suddenly or with an essentially large amount of force—that is, with slamming, jerking, yanking, or pulling, and with sudden lurches, jerks, swings, or stops. The present invention may further permit the door to be opened gradually and slammed shut or shut suddenly or shut with an essentially great amount of force, or permit the door to be opened suddenly or opened with a great amount of force and shut gradually.

Therefore, in another possible embodiment of the present invention, the present invention teaches the interposition of a device between the output shaft of the pivot-hung door drive system and the force transmission mechanism. The interposed transmission, for example, thereby may transmit an optimum reference circle curve, as a result of which the necessary change in the length of the lever is separated from the function of the conversion of the translation movement of the piston motion into the rotational movement of the lever. A toothed rack may thereby be paired with a conventional pinion.

In other words, in one possible embodiment of the present invention, the output shaft or closer shaft may be actuated by a spring system in the closing direction. Also, an end of the output shaft or closer shaft may extend out of the door closer housing. The end of the output shaft or closer shaft may be coupled and connected to one end of a linkage arm, an effective lever arm, a slide rail linkage, or an actuator arm, so that the other end of the linkage arm, effective lever arm, slide rail linkage, or actuator arm may interact with a sliding block of a slide rail.

In yet another possible embodiment of the present invention, the present invention teaches that the transmission that varies its translation ratio over the closing and opening angle of the door therefore may have a guide connected with an output shaft and a driver roller that can be moved in a translation movement in this guide, which driver roller is connected with a pinion that is engaged in a toothed rack that is coupled to the spring system, whereby the axis of rotation of the output shaft and the axis of rotation of the pinion, as well as the axis of rotation of the driver roller and the axis of rotation of the pinion, are located at essentially pre-determined distances from each other, so that when the output shaft and the pinion rotate, the translation ratio may change as a result of the varying axial distance between the output shaft and the driver roller.

In still another possible embodiment of the present invention, the axis of rotation of the driver roller intersects the pitch circle of the pinion and is oriented essentially parallel to the axis of rotation of the pinion. The result is a greatly compact and space-saving construction, but one which simultaneously takes into consideration the desired variable translation ratios over the opening angle of the door panel of the door with which the system is associated.

In other words, the present invention may display several advantages over the prior art. For example, the invention may permit greatly compact and space-saving construction and thus permit the installation of a door drive or door closer in a greatly small space or on an essentially small door or door frame. Also, the present invention is greatly economical because it may permit greatly simple construction—that is, construction involving an essentially small number of parts—and because the present invention may, for instance, permit use of an essentially weak spring. Additionally, the present invention may greatly reduce wear on the parts and components of the door drive system—for example, the spring, the piston or piston-cylinder structure, and the rack.

The translation ratio of the transmission may be determined by the pitch circle diameter of the pinion, the distance of the axis of rotation of the output shaft from the axis of rotation of the pinion, and by the distance of the driver roller from the axis of rotation of the pinion. By varying these individual values, the translation ratio and thus the torque curve of the pivot-hung door drive system can be varied over the opening angle of the door panel. The result is different translation ratios and thus the ability to adapt the system to the desired torque characteristics over the opening angle, in which only the above-mentioned components and values may need to be changed.

In one possible embodiment of the invention, the drive system for the pivot-hung door may be realized with an effective lever arm between a coupling point on the rotationally movable door panel of the associated door and an additional coupling point outside the door panel, which lever arm may be varied over the range of rotation and may be engaged with the output shaft.

In another possible embodiment of the invention, the effective lever arm is preferably formed by a slide rail arm.

In other words, the actuator arm or effective lever arm may be formed as a slide rail linkage. The slide rail linkage may be engaged in a guide rail by use of a slide, which may be located at the other end of the actuator arm or effective lever arm.

In yet another possible embodiment of the invention, the effective lever arm or actuator arm or linkage may be formed by a scissors-type or pantograph or parallel linkage arrangement.

In yet another possible embodiment of the invention, the effective lever arm or actuator arm or linkage may be formed by a toggle-lever arrangement.

Someone skilled in the art would be able to determine the characteristics of the drive system based, for example, upon the weight and size of the door, the location in which the door is installed, the purpose or purposes for which the door is used, the circumstances under which the door is used or installed, and the type of linkage or actuator arm used.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Additional possible advantages and features of the invention are described in greater detail below with reference to one exemplary embodiment of the invention illustrated in the accompanying drawings, in which.

DESCRIPTION OF THE PREFERRED EMBODIMENT

Figure 1:
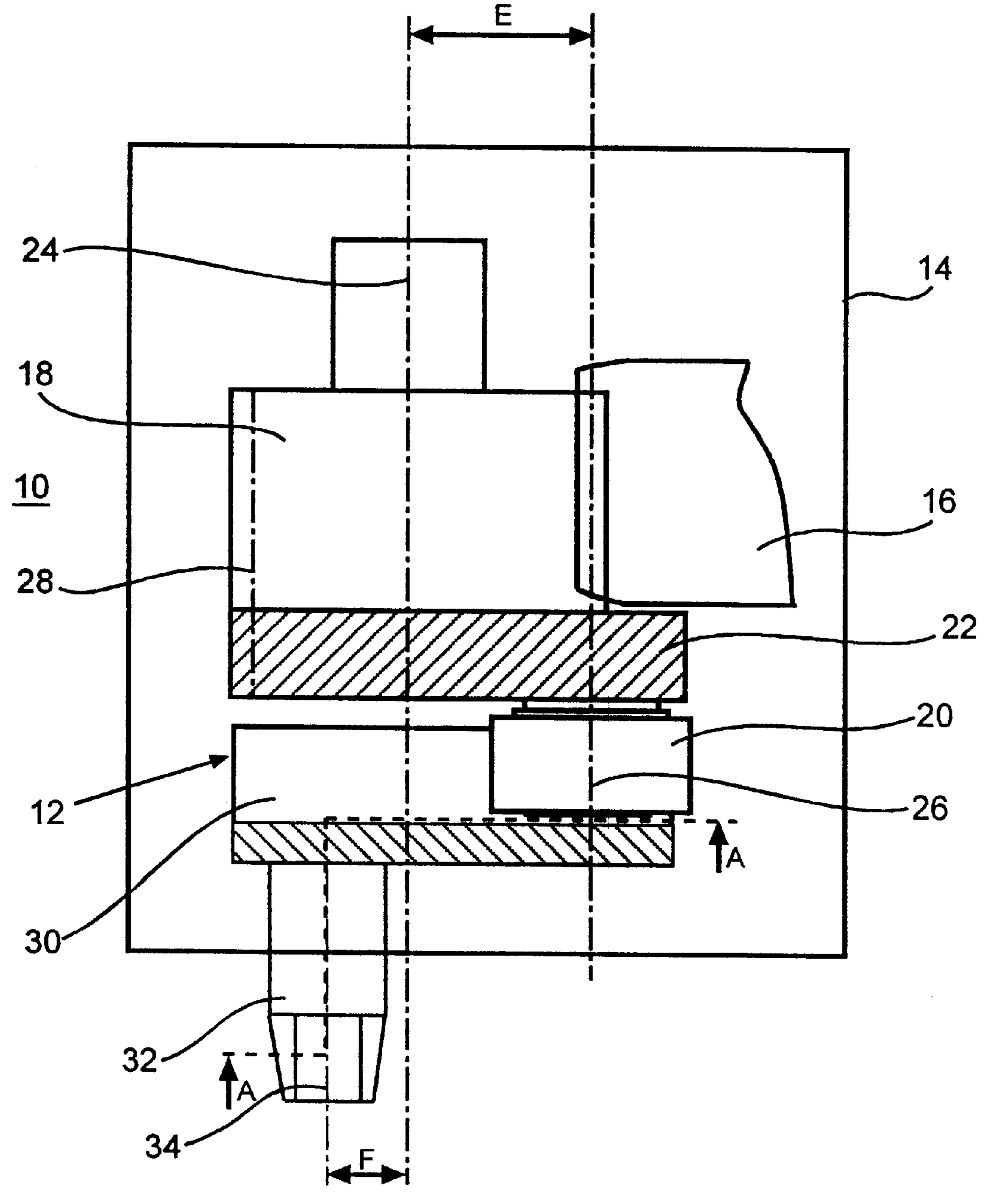
FIG. 1 is a schematic sectional view of the transmission of the pivot-hung door drive system.

FIG. 1 is a schematic view of a device 10 with a transmission 12, which is located in a housing 14 of the pivot-hung door drive system. The illustrated embodiment does not show the parts of the pivot-hung door drive system that are described in some publications.

The transmission 12 thereby interacts with a toothed rack 16. Engaged in the toothed rack 16 is a pinion 18 which is firmly connected with a driver 22 that supports a driver roller 20, whereby the axis of rotation 24 of the pinion 18 and the axis of rotation of the driver 22 are essentially identical.

In other words, the pinion 18 and the driver 22 may have the same axis of rotation 24.

The axis of rotation 26 of the driver roller 20 is located at a distance E from the axis of rotation 24, so that the axis of rotation 26 intersects the pitch circle 28 of the pinion 18. The axes of rotation 24 and 26 are oriented essentially parallel to each other.

The driver roller 20 is located between a guide 30, or between the two guide rails 36 and 38 that form the guide 30, which is firmly connected with an output shaft 32 that projects out of the housing 14. The axis of rotation 34 of the output shaft 32 and the axis of rotation of the guide 30 are therefore essentially identical.

In other words, the output shaft 32 and the guide 30 may have the same axis of rotation 34.

The axis of rotation 34 of the output shaft 32 and the guide 30 is located at a distance F from the axis of rotation 24 of the pinion 18 and of the driver 22.

A sliding rail arm (not shown) may be engaged on the output shaft 32.

When the door panel to which the pivot-hung door drive system, for example, is attached is opened, the output shaft 32 is rotated. The driver roller 29 is moved by means of a guide 30 that consists of two guide rails 36 and 38—see FIGS. 2 and 3—i.e. the force transmitted by the opening of the door to the output shaft 32 and the guide 30 is transmitted via the guide 30 to the driver roller 20 and thus to the driver 22 and the pinion 18. The driver roller 20 is thereby guided in translation relative to the guide 30. The pinion 18 moves the toothed rack 16 during the opening and closing by the drive motor by means of a control system, on the basis of a sensor signal.

Figure 3:
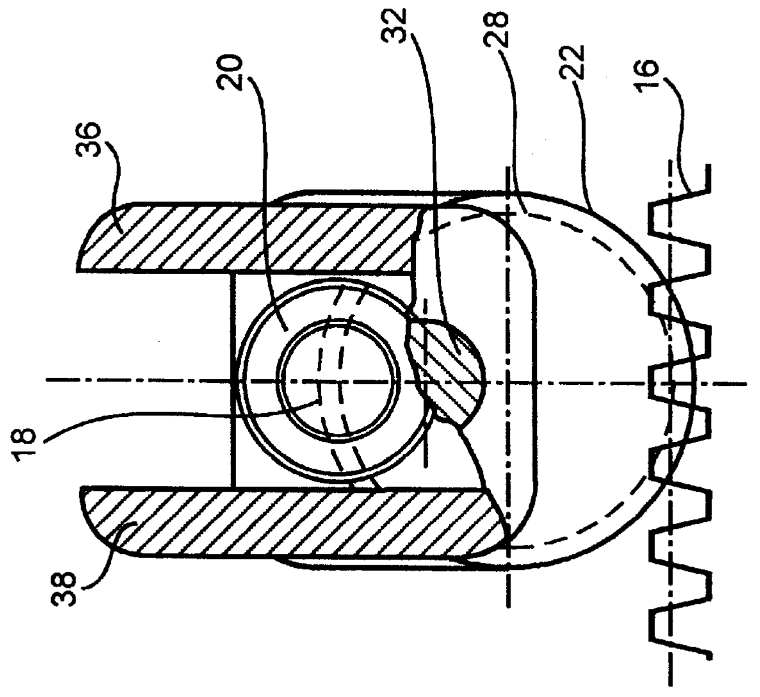
FIG. 2 and FIG. 3 are views along Line A—A in FIG. 1 in positions rotated by 180 degrees.
Figure 2:
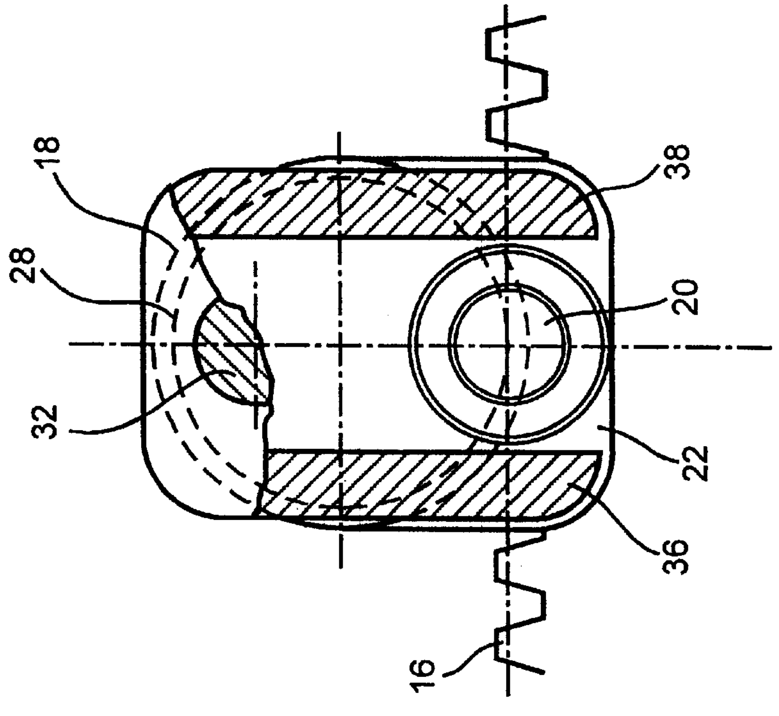

As shown in FIGS. 2 and 3, as the output shaft 32 rotates, and thus the driver 22 with the pinion 18, the relative position of the axis of rotation 26 of the driver roller 20 with respect to the axis of rotation 34 of the output shaft 32 changes. FIGS. 2 and 3 show positions of the transmission 12 in partial section along Line A—A rotated by 180 degrees. The maximum distance of the axis of rotation 26 of the driver roller 20 from the axis of rotation 34 of the output shaft 32 is illustrated in FIG. 2, and the minimum distance of the axis of rotation 26 of the driver roller 20 from the axis of rotation 34 of the output shaft 32, are illustrated in FIG. 3.

As a result of the changing length of the lever arm between the two axes of rotation 26 and 34, the force curve that results over the opening angle changes. The translation ratio of the transmission 12 is determined by the diameter of the pitch circle 28, of the pinion 18, of the distance F of the axis of rotation 34 of the output shaft 32 from the axis of rotation 24 of the pinion 18, and by the distance E from the axis of rotation 26 of the driver roller 20 to the axis of rotation 24 of the pinion 18.

The force curve over the opening angle of the door panel can be influenced, and can thereby be essentially easily defined, by varying these dimensions.

In other words, the force curve over the opening of the door panel can be essentially easily influenced by varying the changing length of the lever arm between the two axes of rotation 26 and 24, the diameter of the pitch circle 18, the diameter of the pinion 18, the distance F of the axis or rotation 34 of the output shaft 32 from the axis of rotation 24 of the pinion 18, and by the distance E from the axis of rotation 26 of the driver roller 20 to the axis of rotation 24 of the pinion 18, the size of the driver roller 20, and the weight and the size of the door.

Over the opening angle of a door panel of a door, it thereby becomes possible to influence in a greatly simple manner the effective length of the lever arm which is changed by the sliding rail arm, and thus to influence the force and torque curve that changes over the opening angle of the door panel.

This influence is possible both in electro-mechanical and electro-hydraulic pivot-hung door drive systems, and also on pivot-hung door drive systems which are considered opening assistance mechanisms, i.e. when the connected door panel is opened, a spring is simultaneously stretched, which provides the force for the subsequent closing of the door without the drive system.

Figure 4:
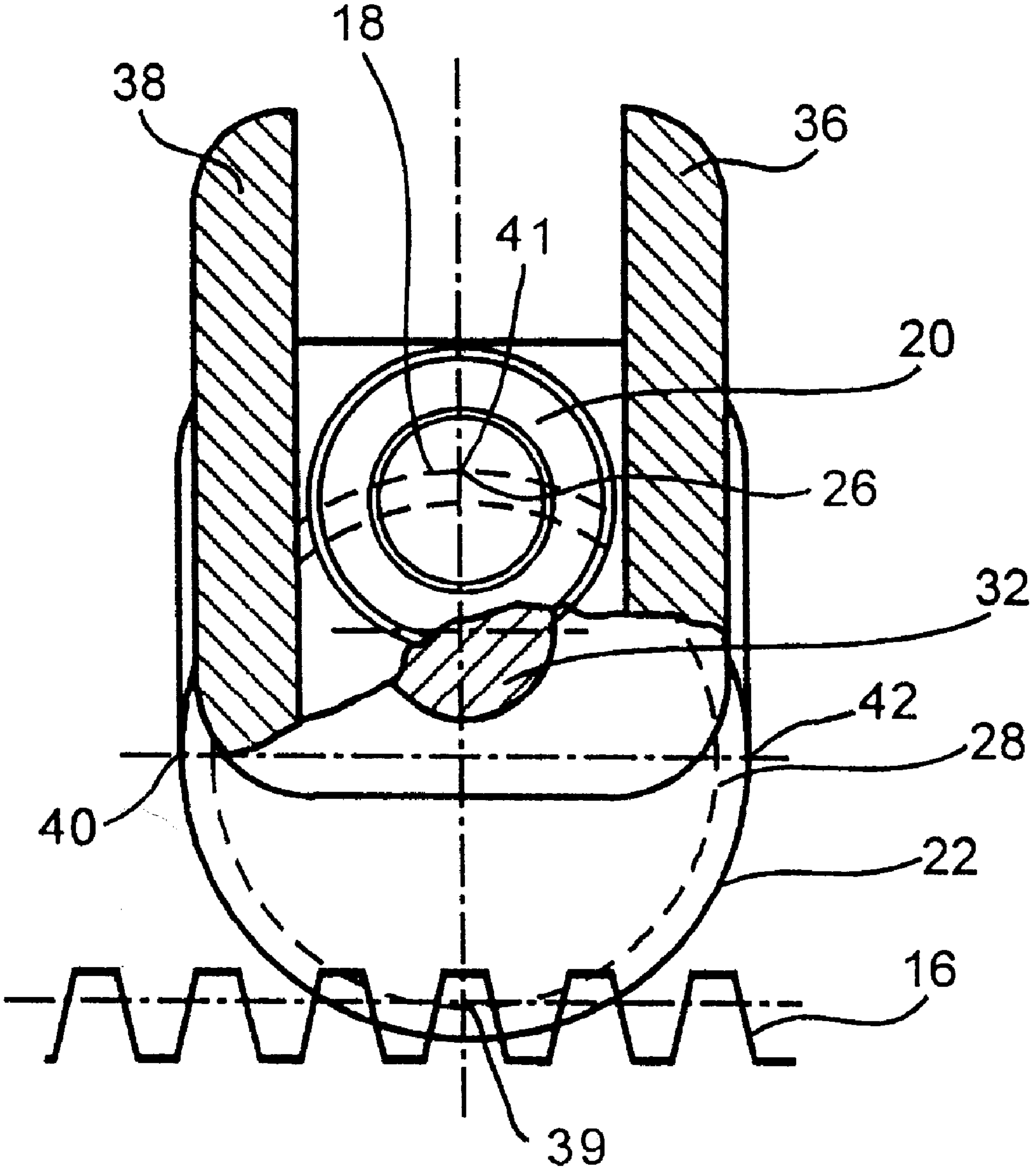
FIG. 4 is a duplicate of FIG. 3 having additional information.

FIG. 4 shows the axis of rotation 26 of the drive roller 20 and the output shaft 32. In one possible embodiment of the invention, the driver roller 20, the output shaft 32, and the guide rails 38 and 36 may rotate counterclockwise from the extreme top point 41, to the extreme right point 42, to the extreme bottom point 39, to the extreme left point 40, or may rotate counterclockwise vice versa. That is, the driver roller 20, the output shaft 32, and the guide rails 38 and 36 may be able to rotate from 90 degrees to 360 degrees. If the drive roller 20 rotates clockwise or counterclockwise to the extreme right point 42, the guide rails 38 and 36 are shifted to the right. If the drive roller 20 rotates clockwise or counterclockwise to the extreme left point 40, the guide rails 36 and 38 are shifted to the left.

Figure 5:
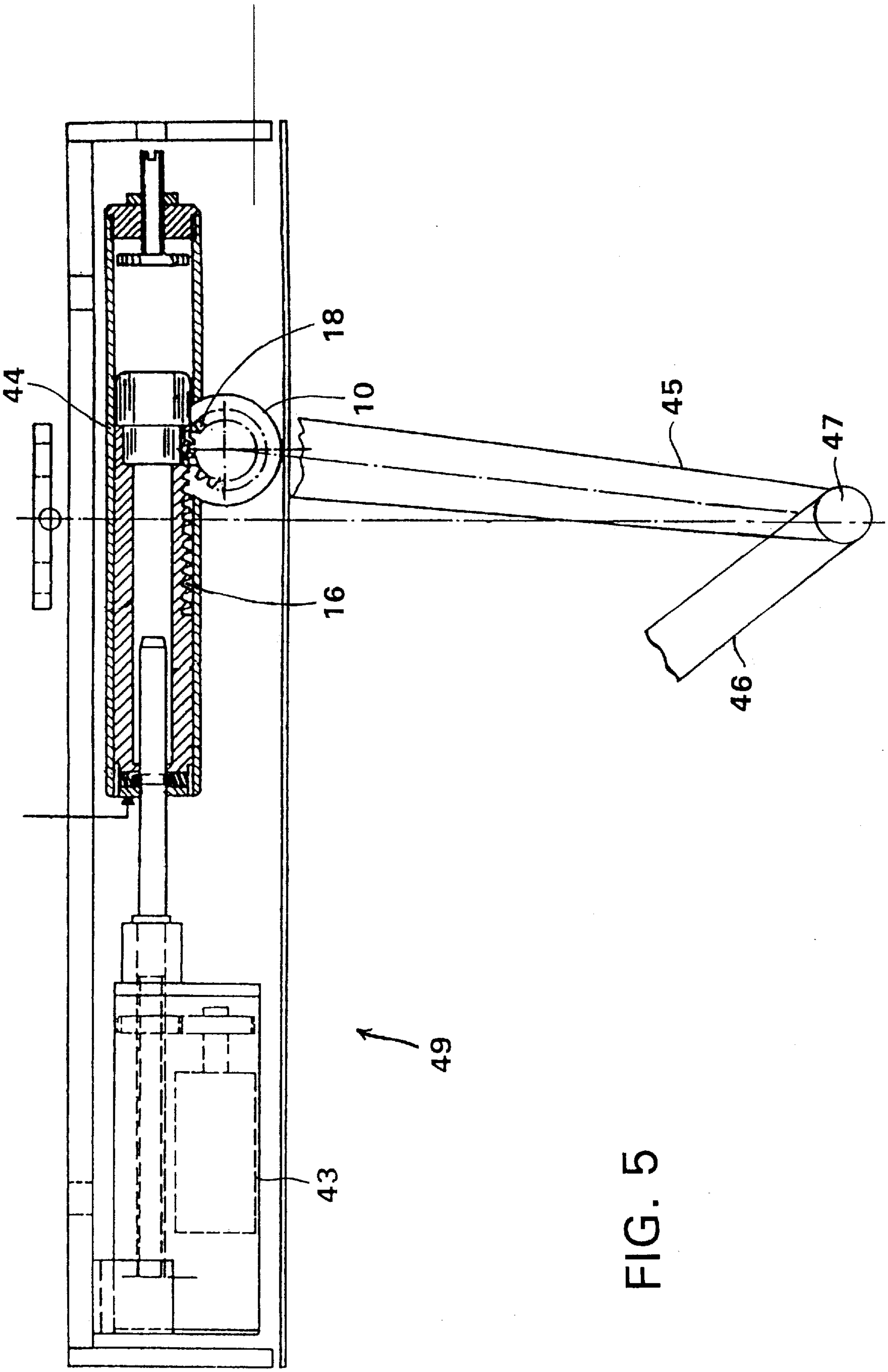
FIG. 5 is a schematic sectional view of a possible arrangement of a door drive system in which a rack and pinion, a device, a piston structure, and a motor are used.

FIG. 5 is a copy of the figure from German Patent No. DE 37 30 114 A1, having the German title "Vorrichtung zum Oeffnen und Schliessen von Tueren", having the inventor Tschanz, filed in Germany on Sep. 8, 1987, and laid open May 11, 1988, from which copy of which figure all of the reference numerals present in the original figure, as it appears in German Patent No. DE 37 30 114 A1, have been removed. German Patent No. DE 37 30 114 A1 is hereby incorporated by reference as if set forth in its entirety herein. The reference numerals that have been removed from the figure for this German Patent, essentially reproduced herein as FIG. 5, indicate structures and arrangements that are well known in the prior art.

In one possible embodiment of the present invention, illustrated in FIG. 5, the present invention includes a door closer 49, which door closer 49 involves a motor 43, a piston-cylinder structure 44, a rack 16 and a pinion 18, and a device 10 between a linkage or actuator arm and the rack 16 and pinion 18. In the embodiment illustrated in FIG. 5, the linkage has a first linkage arm 45, a second linkage arm 46, and a connection 47. In other possible embodiments of the present invention, other types of linkages—for example, slide rail linkages—may be used.

In the embodiment of the present invention illustrated in FIG. 5, the motor 43 drives the piston or piston-cylinder structure 44, which piston or piston-cylinder structure 44 is engaged with a rack 16, which rack 16 is in turn engaged with a pinion 18. Between the rack 16 and the pinion 18, the device 10 changes the translation ratio of the door closer 49 as the door is opened or closed. As the door is opened or closed, the motor 43 drives the piston or piston-cylinder structure 44, which piston or piston-cylinder structure 44 thereby drives the rack 16. As the rack 16 moves, it causes the pinion 18 to rotate, which rotation of the pinion 18 causes movement of the first linkage arm 45 and the second linkage arm 46 by means of a connection 47. The device 10 between the rack 16 and the pinion 18 and the linkage, represented by first linkage arm 45, second linkage arm 46, and connection 47, permit the translation ratio of the door closer 49 to change as the door is opened and closed.

Figure 6:
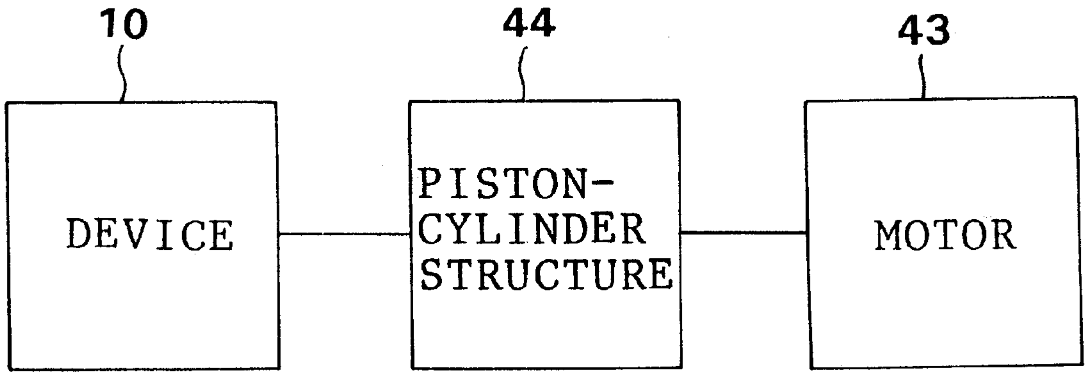
FIG. 6 is a block diagram showing a connection between a device, a piston, and a motor, which connection may be used in a possible embodiment of the present invention.

FIG. 6 illustrates another possible embodiment of the invention, in which a device 10 is connected to a piston or piston-cylinder structure 44, which piston or piston-cylinder structure 44 is connected to a motor 43. The motor 43 drives the piston or piston-cylinder structure 44, which piston or piston-cylinder structure 44 is connected directly to the device 10.

Figure 7:
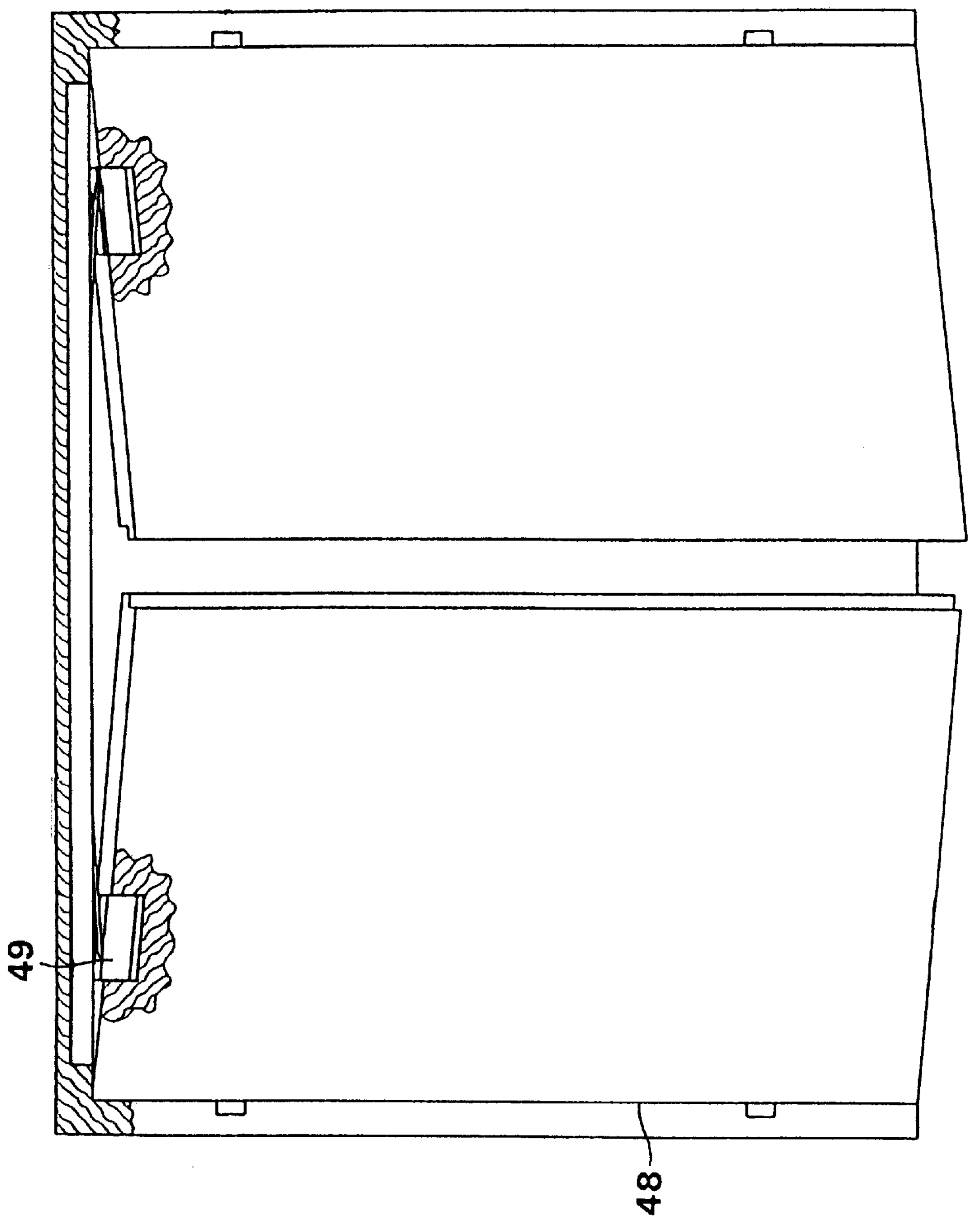
FIG. 7 is a head-on view of a door panel and a door closer, which door panel and door closer may be used in a possible embodiment of the present invention.

FIG. 7 shows a door panel 48 and a door closer 49, which door panel 48 and door closer 49 may be used in a possible embodiment of the present invention. In one possible embodiment of the invention, the door closer 49 may be installed inside the door in the upper area of the door.

Figure 8:
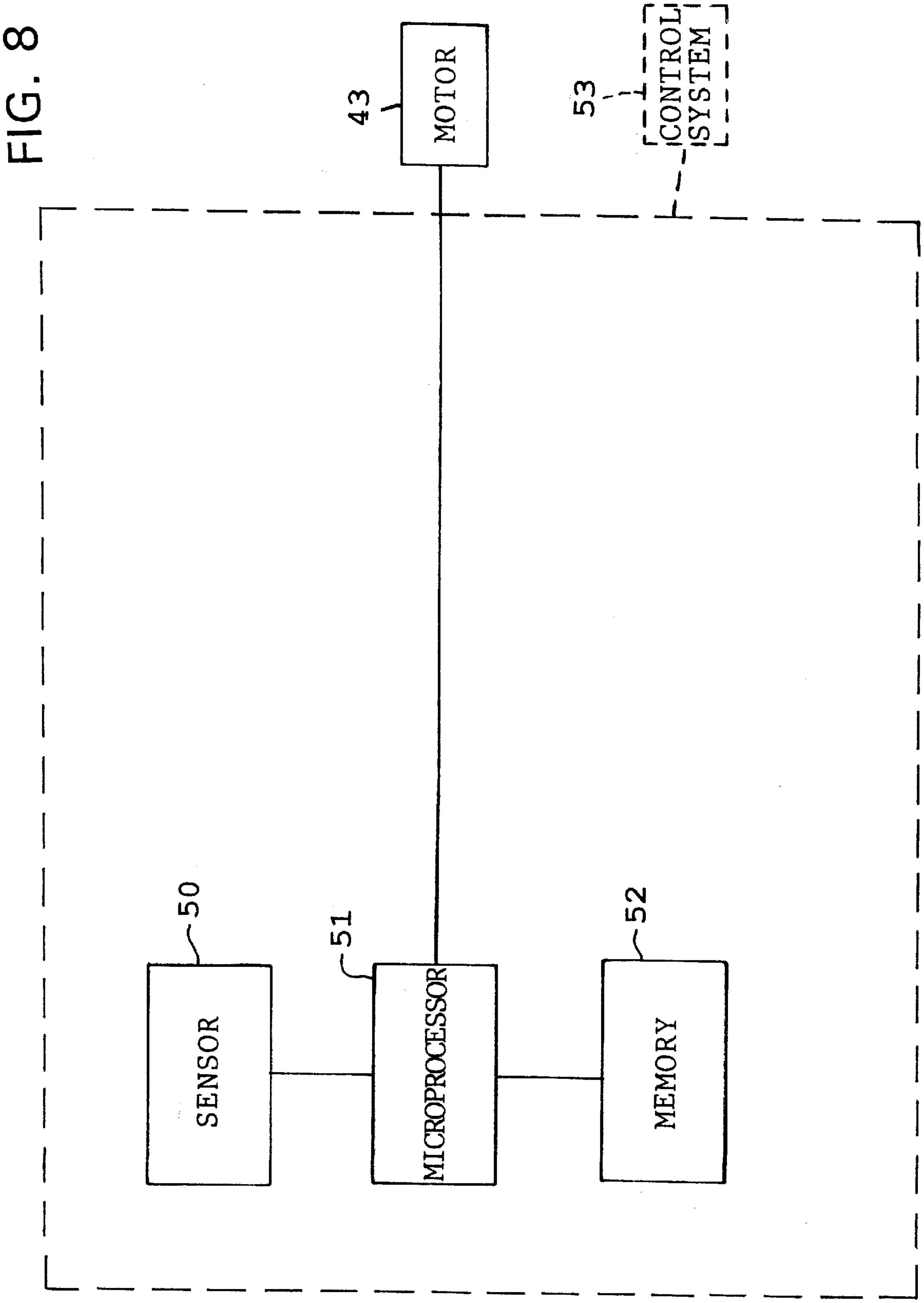
FIG. 8 is a block diagram showing a connection between a motor and a microprocessor, a sensor, and a memory, which connection may be used in a possible embodiment of the present invention.

FIG. 8 illustrates yet another possible embodiment of the invention, in which a motor 43 is connected to a microprocessor 51, which microprocessor 51 is connected to both a sensor 50 and a memory 52, which microprocessor 51, sensor 50, and memory 52 are arranged in a control system 53. In still another possible embodiment of the present invention, more than one microprocessor 51 may be used; more than one sensor 50 may be used; more than one memory 52 may be used; and/or a plurality of microprocessors, sensors, and/or memories may be used.

One feature of the invention resides broadly in the pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, controls the opening or closing moment by means of an output shaft which is generated by or connected with a linkage or an actuator arm, characterized by the fact that between the output shaft 32 of the pivot-hung door drive system and the linkage or the actuator arm, there is a device 10 that effects a change in the opening and closing moment over the angle of rotation of the pivot-hung door panel.

Another feature of the invention resides broadly in the pivot-hung door drive system with an electro-mechanical or electro-hydraulic drive device that supplies the opening and closing moment required to open and close a connected pivot-hung door panel, whereby an electronic regulation/control system with at least one memory and at least one microprocessor, on the basis of sensor signals, supplies the opening moment by means of an output shaft, whereby directly or indirectly connected with the drive device is a transmission which is connected with a shaft that emerges from a door closer and is connected with the pivot-hung panel by means of an output shaft of the door closer with a linkage or an actuator arm, characterized by the fact that between the output shaft of the pivot-hung door drive system and the linkage or the actuator arm, there is a device 10 that effects a change in the opening and closing moment over the angle of rotation of the pivot-hung door panel.

Yet another feature of the invention resides broadly in the pivot-hung door drive system characterized by the fact that the device 10 is a transmission 12 that has different translation ratios.

Still another feature of the invention resides broadly in the pivot-hung door drive system characterized by the fact that the transmission 12 which varies its translation ratio over the angle of rotation of the pivot-hung door panel comprises a guide 3 that is connected with the output shaft 32 and a driver roller 20 that can execute a translation movement relative to the guide 30 and in the guide 30, which driver roller 20 is connected with a pinion engaged with a toothed rack 16 that is connected to the electro-mechanical or electro-hydraulic device, whereby the axis of rotation 34 of the output shaft 32 and the axis of rotation 24 of the pinion 18, and the axis of rotation 26 of the driver roller 20 and the axis of rotation 24 of the pinion 18 are at defined distances (E and F) from each other, such that when the pinion 18 is rotated, the translation ratio of the output shaft 32 changes as a result of the changing axial distance between the output shaft 32 and the driver roller 20.

A further feature of the invention resides broadly in the pivot-hung door drive system characterized by the fact that the transmission 12 which varies its translation ratio over the angle of rotation of the pivot-hung door panel comprises a guide 3 that is connected with the output shaft 32 and a driver roller 20 that can execute a translation movement relative to the guide 30 and in the guide 30, which driver roller 20 is connected with a pinion engaged with a toothed rack 16 that is connected to the electro-mechanical or electro-hydraulic device, whereby the axis of rotation 34 of the output shaft 32 and the axis of rotation 24 of the pinion 18, and the axis of rotation 26 of the driver roller 20 and the axis of rotation 24 of the pinion 18 are at defined distances (E and F) from each other, such that when the pinion 18 is rotated, the translation ratio of the output shaft 32 changes as a result of the changing the axial distance between the output shaft 32 and the driver roller 20.

Another feature of the invention resides broadly in the pivot-hung door drive system characterized by the fact that the axis of rotation 26 of the driver roller 2 intersects the pitch circle 28 of the pinion 18 and is oriented parallel to the axis of rotation 24 of the pinion 18.

Yet another feature of the invention resides broadly in the pivot-hung door drive system characterized by the fact that the translation ratio of the transmission 12 is determined by the diameter of the pitch circle 28 of the pinion 18, the distance F of the axis of rotation 34 of the output shaft 32 from the axis of rotation 24 of the pinion 18 and the distance E of the axis of rotation 24 of the driver roller 20 from the axis of rotation 24 of the pinion 18.

Still another feature of the invention resides broadly in the pivot-hung door drive system characterized by the realization of the pivot-hung door drive system with a lever arm which effectively varies over the range of rotation between a coupling point of the rotational door panel of the associated door and another coupling point outside the rotating panel, which lever arm is engaged with the output shaft 32.

A further feature of the invention resides broadly in the pivot-hung door drive characterized by the fact that the effective lever arm is formed by a slide-rail linkage.

Another feature of the invention resides broadly in the pivot-hung door drive characterized by the fact that the effective lever arm is formed by a toggle-lever linkage.

Some examples of linkages or actuator arms which may be utilized or incorporated in a possible embodiment of the present invention may be found in the following U.S. Pat. No. 5,417,013, issued to inventor Tillmann on May 23, 1995; U.S. Pat. No. 5,163,494, issued to inventors MacNeil et al. on Nov. 17, 1992; U.S. Pat. No. 5,149,180, issued to inventors Haab et al. on Sep. 22, 1992; U.S. Pat. No. 5,121,976, issued to inventors Haab et al. on Jun. 16, 1992; U.S. Pat. No. 5,058,238, issued to inventor Lautenschlager on Oct. 22, 1991; U.S. Pat. No. 4,821,375, issued to inventor Kozon on Apr. 18, 1989; U.S. Pat. No. 4,759,099, issued to inventors Morano et al. on Jul. 26, 1988; U.S. Pat. No. 4,669,147, issued to inventor Suchanek on Jun. 2, 1987; U.S. Pat. No. 4,419,787, issued to inventor Lieberman on Dec. 13, 1983; U.S. Pat. No. 4,285,094, issued to inventor Levings, Jr. on Aug. 25, 1981; U.S. Pat. No. 4,184,382, issued to inventor Redman on Jan. 22, 1980; and U.S. Pat. No. 4,080,687, issued to inventor Jentsch on Mar. 28, 1978.

Some examples of door closers which may be utilized or incorporated in a possible embodiment of the present invention may be found in the following U.S. Pat. No. 5,832,561, issued to inventor Bienek on Nov. 10, 1998; U.S. Pat. No. 5,802,670, issued to inventor Bienek on Sep. 8, 1998; U.S. Pat. No. 5,770,934, issued to inventor Theile on Jun. 23, 1998; U.S. Pat. No. 5,651,216, issued to inventor Tillmann on Jul. 29, 1997; U.S. Pat. No. 5,428,278, issued to inventors Bollengier et al. on Jun. 27, 1995; U.S. Pat. No. 5,417,013, issued to inventor Tillmann on May 23, 1995; U.S. Pat. No. 5,251,400, issued to inventor Schultze on Oct. 12, 1993; U.S. Pat. No. 4,669,147, issued to inventor Suchanek on Jun. 2, 1987; U.S. Pat. No. 4,501,090, issued to inventors Yoshida et al. on Feb. 26, 1985; U.S. Pat. No. 4,419,787, issued to inventor Lieberman on Dec. 13, 1983; and U.S. Pat. No. 4,285,094, issued to inventor Levings, Jr. on Aug. 25, 1981. Some further examples of door closers which may be utilized or incorporated in a possible embodiment of the present invention may be found in the advertising brochure, entitled "Das Programm", for the company DORMA GmbE + Co. KG, Postfach 4009, D-58247 Ennepetal, Federal Republic of Germany, which advertising brochure bears the following identifying information: WN 051307, December 1996, Programm, D, 10, STB, February 1997, Atelier G. Beinz, Velbert, which advertising brochure describes, for example, on page 25, the door closer or drive system named the "DORMA ED 200".

Some examples of drives or electromechanical or electro-hydraulic drives which may be utilized or incorporated in a possible embodiment of the present invention may be found in the following U.S. patents: No. 5,666,268, issued to inventors Rix et al. on Sep. 9, 1997; No. 5,386,885, issued to inventors Bunzl et al. on Feb. 7, 1995; No. 5,521,400, issued to inventor Schultze on Oct. 12, 1993; No. 5,080,635, issued to inventors Martrinez et al. on Jan. 14, 1992; No. 4,501,090, issued to inventors Yoshida et al. on Feb. 26, 1985; and No. 4,430,846, issued to inventors Presley et al. on Feb. 14, 1984.

Some examples of electronic control or electronic regulation systems which may be utilized or incorporated in a possible embodiment of the present invention may be found in the following U.S. patents: No. 5,770,934, issued to inventor Theile on Jun. 23, 1998; No. 5,666,268, issued to inventors Rix et al. on Sep. 9, 1997; No. 5,625,266, issued to inventor Stark on Apr. 29, 1997; No. 5,428,278, issued to inventors Bollengier et al. on Jun. 27, 1995; and No. 4,838,052, issued to inventors Williams et al. on Jun. 13, 1989.

Some examples of control systems which measure operating parameters and learn therefrom which may be utilized or incorporated in a possible embodiment of the present invention may be found in the following U.S. patents: No. 5,770,934, issued to inventor Theile on Jun. 23, 1998; No. 5,191,272, issued to inventors Torii et al. on Mar. 2, 1993; No. 5,223,820, issued to inventors Sutterlin et al. on Jun. 29, 1993; and No. 4,655,188, issued to inventors Tomisawa et al. on Apr. 7, 1987.

Some examples of memories which may be utilized or incorporated in a possible embodiment of the present invention may be found in the following U.S. patents; No. 5,789,887, issued to inventor Elischewski on Aug. 4, 1998; No. 5,770,934, issued to inventor Theile on Jun. 23, 1998; No. 5,453,736, issued to inventor Noren on Sep. 26, 1995; No. 5,315,220, issued to inventors Takimoto et al. on May 24, 1994; No. 4,994,724, issued to inventor Hsu on Feb. 19, 1991; No. 4,498,033, issued to inventors Aihara et al. on Feb. 5, 1985; and No. 4,328,540, issued to inventors Matsuoka et al. on May 4, 1982.

Some examples of microprocessors which may be utilized or incorporated in a possible embodiment of the present invention may be found in the following U.S. patents: No. 5,770,934, issued to inventor Theile on Jun. 23, 1998; No. 5,653,056, issued to inventor Stark on Aug. 5, 1997; No. 5,647,173, issued to inventors Stark et al. on Jul. 15, 1997; No. 5,625,266, issued to inventor Stark on Apr. 29, 1997; No. 5,479,151, issued to inventors Lavelle et al. on Dec. 26, 1995; No. 5,453,736, issued to inventor Noren on Sep. 26, 1995; No. 5,437,174, issued to inventor Aydin on Aug. 1, 1995; No. 5,274,312, issued to inventor Gertsenkorn on Dec. 28, 1993; No. 5,230,179, issued to inventors Richmond et al. on Jul. 27, 1993; No. 5,142,152, issued to inventor Boiucaner on Aug. 25, 1992; No. 5,140,173, issued to inventors Chau et al. on Aug. 18, 1992; No. 5,136,809, issued to inventors Richmond et al. on Aug. 11, 1992; No. 5,132,503, issued to inventor Lee on Jul. 21, 1992;No. 4,980,618, issued to inventors Milnes et al. on Dec. 25, 1990; No. 4,831,509, issued to inventors Jones et al. on May 16, 1989; No. 4,815,046, issued to inventor Dorr on Mar. 21, 1989; and No. 4,779,240, issued to inventor Dorr on Oct. 18, 1988.

Some examples of open-loop control system which may be utilized or incorporated in a possible embodiment of the present invention may be found in the following U.S. patents: No. 5,770,934, issued to inventor Theile on Jun. 23, 1998; No. 5,210,473, issued to inventor Backstrand on May 11, 1993; No. 5,320,186, issued to inventors Strosser et al. on Jun. 14, 1994; and No. 5,369,342, issued to inventors Rudzewicz et al. on Nov. 29, 1994.

Some examples of closed-loop control circuits which may be utilized or incorporated in a possible embodiment of the present invention may be found in the following U.S. patents: No. 5,770,934, issued to inventor Theile on Jun. 23, 1998; No. 5,189,605, issued to inventors Zuehlke et al. on Feb. 23, 1993; No. 5,223,072, issued to inventors Brockman et al. on Jun. 29, 1993; and No. 5,252,901, issued to inventors Ozawa et al. on Oct. 12, 1993.

Some examples of look up tables accessed by computers or microprocessors which may be utilized or incorporated in a possible embodiment of the present invention nay be found in the following U.S. patents: No. 5,284,116, issued to inventor Richeson, Jr. on Feb. 8, 1994; No. 5,359,325, issued to inventors Ford et al. on Oct. 25, 1994; and No. 5,371,537, issued to inventors Bohan et al. on Dec. 6, 1994.

Some examples of sensors, sensor systems, pressure sensing apparatuses, and/or strain gauges which may be utilized or incorporated in a possible embodiment of the present invention may be found in the following U.S. patents: No. 5,770,934, issued to inventor Theile on Jun. 23, 1998; No, 5,625,266, issued to inventor Stark on Apr. 29, 1997; No. 5,428,278, issued to inventors Bollengier on Jun. 27, 1995; No. 5,303,593, issued to inventor Kremidas on Apr. 19, 1994; No. 5,287,757, issued to inventors Polaert et al. on Feb. 22, 1994; No. 5,251,400, issued to inventor Schultze on Oct. 12, 1993; No. 5,241,308, issued to inventor Young on Aug. 31, 1993; No. 5,199,519, issued to inventors Polaert et al. on Apr. 6, 1993; No. 5,191,798, issued to inventors Tabata et al. on Mar. 9, 1993; No. 5,186,060, issued to inventor Marlier on Feb. 16, 1993; No. 5,142,152, issued to inventor Boiucaner on Aug. 25, 1992; No. 4,815,046, issued to inventor Dorr on Mar. 21, 1989; No. 4,779,240, issued to inventor Dorr on Oct. 18, 1988; No. 4,501,090, issued to inventors Yoshida et al. on Feb. 26, 1985; and No. 4,430,846, issued to inventors Presley et al. on Feb. 14, 1984.

Some examples of devices or transmissions which may be utilized or incorporated in a possible embodiment of the present invention may be found in the following U.S. patents: No. 4,763,385, issued to inventors Furch et al. on Aug. 16, 1988, and No. 4,744,125, issued to inventors Scheck et al. on May 17, 1988.

Some examples of housing or access panels which may be utilized or incorporated in a possible embodiment of the present invention may be found in the following U.S. Pat. No. 5,327,682, issued on Jul. 12, 1994.

Some examples of guild rails or systems for door, wall or partition systems which may be utilized or incorporated in a possible embodiment of the present invention may be found in the following U.S. patents: No. 5,538,064, issued to inventor Salice on Jul. 23, 1996; No. 5,327,681, issued to inventor Minami on Jul. 12, 1994; No. 4,759,099, issued to inventors Morano et al. on Jul. 26, 1988; No. 4,555,828, issued to inventor Matimura on Dec. 3, 1985; and No. 4,084,289, issued to inventor Naimo on Apr. 18, 1978.

Some examples of doors, foldable doors, or door systems and mechanisms and devices for their operation which may be utilized or incorporated in a possible embodiment of the present invention may be found in the following U.S. patents: No. 5,762,123, issued to inventors Kuyama et al. on Jun. 9, 1998; No. 5,651,216, issued to inventor Tillmann on Jul. 29, 1997; No. 5,186,230, issued to inventor Ostrander on Feb. 16, 1993; No. 5,165,142, issued to inventor Pilsbury on Nov. 24, 1992; No. 5,163,494, issued to inventors Mac- Neil et al. on Nov. 17, 1992; No. 5,099,903, issued to inventor Chen on Mar. 31, 1992; No. 5,070,926, issued to inventor Behring on Dec. 10, 1991; and No. 4,932,455, issued to inventor Yamada on Jun. 12, 1990.

Some examples of movable partition or wall systems and devices for their operation which may be utilized or incorporated in a possible embodiment of the present invention may be found in the following U.S. patents: No. 5,730,027, issued to inventor Hormann on Mar. 24, 1998; No. 5,461,829, issued to inventors Lehto et al. on Oct. 31, 1995; No. 5,404,675, issued to inventor Schmidhasuer on Apr. 11, 1995; No. 5,329,857, issued to inventor Owens on Jul. 19, 1994; No. 5,295,281, issued to inventor Kordes on Mar. 22, 1994; No. 5,394,648, issued to inventor Kordes on Mar. 7, 1995; No. 5,417,013, issued to inventor Tillmann on May. 23, 1995; No. 5,544,462, issued to inventor Kordes on Aug. 13, 1996; No. 5,406,761,issued to inventors Hobbiebrunken et al. on Apr. 18, 1995; No. 5,152,332, issued to inventor Siener on Oct. 6, 1992; No. 5,042,555, issued to inventor Owens on Aug. 27, 1991; No. 4,934,119, issued to inventor Ybarra on Jun. 19, 1990; No. 4,914,878, issued to inventors Tamaki et al. on Apr. 10, 1990; No. 4,895,246, issued to inventor Rizzi on Jan. 23, 1990; No. 4,752,987, issued to inventors Dreyer et al. on Jun. 28, 1988; No. 4,596,094, issued to inventors Teller et al. on Jun. 24, 1986; No. 4,555,828, issued to inventor Matmura on Dec. 3, 1985; No. 4,458,462, issed to inventor Schold on Jul. 10, 1984; No. 4,404,770, issued to inventor Markus on Sep. 20, 1983; and No. 4,112,647, issued to inventor Scheid on Sep. 12, 1978.

The components disclosed in the various publications, discloses or incorporated by reference wherein, may be used in the embodiments of the present invention, as well as equivalents thereof.

The appended drawings in their entirety, including all dimensions, proportions and/or shapes in at least one embodiment of the invention, are accurate and to scale and are hereby included by reference into this specification.

All, or essentially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 199 01 033.1, filed on Jan. 14, 1999, having the German title "Drehtuerantrieb", having inventors Jan Scholten, Peter Kisters and Guido Schmenider, and having assignee DORMA GmbH+Co. KG, Ennepetal, Federal Republic of Germany, and DE-OS 199 01 033.1 and DE-PS 199 01 033.1, as well as their published equivalents, and other equivalents, or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A pivot-hung door drive system with an electromechanical drive device that is configured to supply the opening and closing moment required to open and close a connected pivot-hung door panel, said drive system, comprising:

an electronic control system comprising at least one memory, at least one microprocessor, and at least one senor, all operatively interconnected together;

said at least one memory being configured and connected to store at least one characteristic of operation of said drive system;

said at least one microprocessor being connected to said drive system and configured to control said drive system;

said at least one senor being configured to indicate at least one operating status of a connected door panel to said at least one microprocessor;

a motor arrangement being operatively connectable to a door panel to drive a door panel;

a drive arrangement connected to said motor arrangement, said drive arrangement being configured to be driven by said motor arrangement;

a transmission arrangement connected to said drive arrangement, said transmission arrangement being configured to be driven by said drive arrangement;

a linkage configured to move a door panel, said linkage being connected to said transmission arrangement and said linkage being configured to be driven by said transmission arrangement;

said transmission arrangement comprising an input arrangement and an output arrangement;

said input arrangement being connected to said drive arrangement;

said output arrangement being connected to said linkage; and said transmission arrangement comprising means of changing the relationship between the movement of said input arrangement and said output arrangement dependent upon the position and angle of rotation of one of said input arrangement and said output arrangement to provide differences in the opening and closing moments of said output arrangement over rotation of a door panel dependent upon the position of said output arrangement and the angle of rotation of said output arrangement to minimize force provided by said drive arrangement to close a door.

2. The pivot-hung door drive system according to claim 1, wherein:

said input arrangement has an angle of movement;

said output arrangement has an angle of movement; and said means for changing the relationship between the movement of said input arrangement and said output arrangement comprises means for changing the angle of movement of said output arrangement and the angle of movement of said input arrangement to provide different translation ratios between said input arrangement and said output arrangement dependent upon a position of said output arrangement within the angle of movement of said output arrangement.

3. The pivot-hung door drive system according to claim 1, wherein:

said drive arrangement comprises a toothed rack;

said output arrangement comprises an output shaft; and said transmission arrangement further comprises:

a pinion;

said pinion meshed with to be driven by said toothed rack;

a guide arrangement operatively connected with and configured to drive said output arrangement;

a driver roller connected to said pinion, said driver roller being configured to provide a translational movement to said guide arrangement;

said output shaft, said guide arrangement, and said driver roller being configured to change the translation ratio of said transmission arrangement;

said output shaft having an axis of rotation;

said pinion having an axis of rotation;

said driver roller having an axis of rotation; and said axis of rotation of said output shaft being disposed a first predetermined distance from said axis of rotation, and said axis of rotation of said driver roller being disposed a second predetermined distance from said axis of rotation of said pinion, such that, upon said pinion being rotated, the translation ratio of said transmission arrangement change upon the changing of a direct distance between said axis of rotation of said output shaft and said axis of rotation of said driver roller.

4. The pivot-hung door drive system according to claim 3, wherein:

said pinion comprises a pitch circle;

said axis of rotation of said pinion lies within said pitch circle; and said axis of rotation of said driver roller is disposed parallel to said axis of rotation of said pinion.

5. The pivot-hung door drive system according to claim 3, wherein the translation ratio of said transmission arrangement is determined by a position of said axis of rotation of said output shaft, a position of said axis of rotation of said pinion, the distance between said axis of rotation of said driver roller and said axis of rotation of said pinion, and the diameter of said pitch circle.

6. The pivot-hung door drive system according to claim 1, wherein said drive system is configured to engage with a slide-rail linkage.

7. The pivot-hung door drive system according to claim 1, wherein said drive system is configured to engage with a toggle-lever linkage.

8. A pivot-hung door drive system with an electro-hydraulic drive device configured to supply the opening and closing moment required to open and close a connected pivot-hung door panel, said drive system comprising:

a motor arrangement being operatively connectable to a door panel to drive a door panel;

a drive arrangement connected to said motor arrangement, said drive arrangement being configured to be driven by said motor arrangement;

a transmission arrangement connected to said drive arrangement, said transmission arrangement being configured to be driven by said drive arrangement;

a linkage configured to move a door panel, said linkage being connected to said transmission arrangement and said linkage being configured to be driven by said transmission arrangement;

said transmission arrangement comprising an input arrangement and an output arrangement;

said input arrangement being connected to said drive arrangement;

said output arrangement being connected to said linkage; and said transmission arrangement comprising means for changing the relationship between the movement of said input arrangement and said output arrangement dependent upon the position and angle of rotation of one of said input arrangement and said output arrangement to provide differences in the opening and closing moments of said output arrangement over rotation of a door panel dependent upon the position of said output arrangement and the angle of rotation of said output arrangement.

9. The pivot-hung door drive system according to claim 8, wherein:

said input arrangement has an angle of movement;

said output arrangement has an angle of movement; and said means for changing the relationship between the movement of said input arrangement and said output arrangement comprises means for changing the angle of movement of said output arrangement and the angle of movement of said input arrangement to provide different translation ratios between said input arrangement and said output arrangement dependent upon a position of said output arrangement within the angle of movement of said output arrangement.

10. The pivot-hung door drive system according to claim 8, wherein:

said drive arrangement comprise a toothed rack;

said output arrangement comprises an output shaft; and said transmission arrangement further comprises:

a pinion;

said pinion being meshed with to be driven by said toothed rack;

a guide arrangement operatively connected with and configured to drive said output arrangement;

a driver roller connected to said pinion, said driver roller being configured to provide a translational movement to said guide arrangement;

said output shaft, said guide arrangement, and said driver roller being configured to change the translation ratio of said transmission arrangement;

said output shaft having an axis of rotation;

said pinion having an axis of rotation;

said driver roller having an axis of rotation; and said axis of rotation of said output shaft being disposed a first predetermined distance from said axis of rotation; and said axis of rotation of said driver roller being disposed a second predetermined distance from said axis of rotation of said pinion; such that upon such pinion being rotated the translation ratio of said transmission arrangment changes upon the changing of a direct distance between said axis of rotation of said output shaft and said axis of rotation of said driver roller.

11. The pivot-hung door drive system according to claim 10, wherein:

said pinion comprises a pitch circle;

said axis of rotation of said pinion lies within said pitch circle; and said axis of rotation of said driver roller is disposed parallel to said axis of rotation of said pinion.

12. The pivot-hung door drive system according to claim 10, wherein the translation ratio of said transmission arrangement is determined by a position of said axis of rotation of said output shaft, a position of said axis of rotation of said pinion, the distance between said axis of rotation of said driver roller and said axis of rotation of said pinion, and the diameter of said pitch circle.

13. The pivot-hung door drive system according to claim 8, wherein said drive system is configured to engage with a slide-rail linkage.

14. The pivot-hung door drive system according to claim 8, wherein said drive system is configured to engage with a slide-rail linkage.

15. A pivot-hung door drive system with a drive device configured to supply the opening and closing moment required to open and close a connected pivot-hung door panel, said drive system comprising:

a motor arrangement being operatively connectable to a door panel to drive a door panel;

a drive arrangement connected to said motor arrangement, said drive arrangement being configured to be driven by said motor arrangement;

an arrangement connected to said drive arrangement, said arrangement being configured to be driven by said drive arrangement;

a linkage configured to move a door panel, said linkage being connected to said arrangement and said linkage being configured to be driven by said arrangement;

said arrangement comprising an input arrangement and an output shaft;

said input arrangement being connected to said drive arrangement; and said arrangement comprising means of changing the relationship between the movement of said input arrangement and said output shaft dependent upon the position and angle of rotation of one of said input arrangement and said output shaft to provide differences in the opening and closing moments of said output shaft over rotation of a door panel dependent upon the position of said output shaft and the angle of rotation of said output shaft.

16. The pivot-hung door drive system according to claim 15, wherein:

said input arrangement has an angle of movement;

said output shaft has an angle of movement; and said means for changing the relationship between the movement of said input arrangement and said output shaft comprises means for changing the angle of movement of said output shaft and the angle of movement of said input arrangement to provide different translation ratios between said input arrangement and said output shaft dependent upon a position of said output shaft within the angle of movement of said output shaft.

17. The pivot-hung door drive system according to claim 15, wherein:

said drive arrangement comprises a toothed rack; and said arrangement further comprises:

a pinion;

said pinion being meshed with to be driven by said toothed rack;

a guide arrangement operatively connected with and configured to drive said output shaft;

a driver roller connected to said pinion, said driver roller being configured to provide a translational movement to said guide arrangement;

said output shaft, said guide arrangement, and said driver roller being configured to change the translation ratio of said arrangement;

said output shaft having an axis of rotation;

said pinion having an axis of rotation;

said driver roller having an axis of rotation; and said axis of rotation of said output shaft being disposed a first predetermined distance from said axis of rotation, and said axis of rotation of said driver roller being disposed a second predetermined distance from said axis of rotation of said pinion, such that, upon said pinion being rotated, the translation ratio of said arrangement changes upon the changing of a direct distance between said axis of rotation of said output shaft and said axis of rotation of said driver roller.

18. The pivot-hung door drive system according to claim 17, wherein:

said pinion comprises a pitch circle;

said axis of rotation of said pinion lies within said pitch circle; and said axis of rotation of said rive roller is disposed parallel to said axis of rotation of said pinion.

19. The pivot-hung door drive system according to claim 17, wherein the translation ratio of said arrangement is determined by a position of said axis of rotation of said output shaft, a position of said axis of rotation of said pinion, the distance between said axis of rotation of said driver roller and said axis of rotation of said pinion, and the diameter of said pitch circle.

20. The pivot-hinge door drive system according to claim 15, wherein said drive system is configured to engage with one of a slide-rail linkage and a toggle-lever linkage.

* * * * *

UNITED STATES PATENT AND TRADEMARK OFFICE

CERTIFICATE OF CORRECTION

PATENT NO. : 6,262,548 B1
DATED : July 17, 2001
INVENTOR(S) : Jan Scholten, Peter Kisters and Guido Schneider It is certified that error appears in the above-identified patent and that said Letters Patent is hereby corrected as shown below:

Column 1,
Line 30, after 'scissors-type', delete "or pantograph" and substitute -- and parallel --.
Line 31, before 'sufficient', delete "linkage" and substitute -- linkages are --.

Column 10,
Line 58, after 'DORMA', delete "GmbE" and substitute -- GmbH --.
Line 63, before 'Velbert,', delete "Beinz," and substitute -- Heinz, --.

Column 14,
Line 30, after 'one', delete "senor" and substitute -- sensor --.

Signed and Sealed this

Seventh Day of May, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,262,548 B1 
DATED : July 17, 2001
INVENTOR(S) : Jan Scholten, Peter Kisters and Guido Schneider It is certified that error appears in the above-identified patent and that said Letters Patent is hereby corrected as shown below:

Column 14,
Line 52, after 'means', delete "of" and substitute -- for --.

Column 15,
Line 15, after 'pinion', insert -- being --.
Line 34, after 'arrangement', delete "change" and substitute -- changes --.

Column 16,
Line 63, after 'upon', delete "such" and substitute -- said --.

Column 18,
Line 41, after the second occurrence of 'said', delete "rive" and substitute -- driver --.

Signed and Sealed this

Thirtieth Day of May, 2002

*Attest:*

JAMES E. ROGAN

*Attesting Officer* *Director of the United States Patent and Trademark Office*